Patented Feb. 14, 1939

2,146,894

UNITED STATES PATENT OFFICE 2,146,894

VACUUM DISTILLATION

Kenneth C. D. Hickman, Rochester, N. Y., assignor, by mesne assignments, to Distillation Products, Inc., Rochester, N. Y., a corporation of Delaware No Drawing. Application October 11, 1935, Serial No. 44,631

10 Claims. (Cl. 167—81)

This invention relates to the purification of organic material, especially such as contained in vegetable and animal oils, fats and waxes, and particularly to the removal from such oils of materials of therapeutic value by vacuum distillation.

Processes of high vacuum distillation are known in which difficultly volatile materials are removed in purer form from impurities and undesirable admixtures. Thus in U. S. patent to Burch 1,955,321 difficultly volatile oils are vacuum distilled to remove desired constituents therefrom. In my U. S. Patent No. 1,925,559, natural oils and fats are vacuum distilled to concentrate compounds of therapeutic value contained therein, such as vitamins.

In such high vacuum distillation processes, due to the difficultly volatile nature of the compound being purified, temperatures considerably above the boiling point of the desired compound under the vacuum obtaining must be used. A satisfactory removal of the desired compound at temperatures lower than those heretofore found necessary is of considerable importance, since it would result in a material saving in material otherwise lost due to decomposition. The amount of heat required to volatilize the desired material would also be considerably less.

The present invention has for its object to overcome the deficiencies of hitherto known vacuum distillation processes for concentrating or purifying materials and to provide a process whereby such materials may be purified without undesirable decomposition and with a considerable saving in time and heat energy. A further object is to provide a process for concentrating therapeutic values contained in natural oils without undesirable decomposition or waste of heat. A still further object is to concentrate the vitamin and/or sterol content of animal and vegetable oils by a process of vacuum distillation which avoids material decomposition of the vitamins and makes possible a faster rate of distillation at a lower temperature than has previously been found possible. Other objects will appear hereinafter.

These objects are accomplished by the following invention which, in its broader aspects, comprises adding to the material to be vacuum distilled a compound or mixture of compounds having a boiling point, under the distillation conditions obtaining, in the neighborhood of that of the material which it is desired to purify.

When the materials being concentrated or purified are distilled, it has been noticed that temperatures considerably above the boiling point of the desired material must be used. Thus, in distilling fish oils, such as cod liver oil, the vitamins distill over at temperatures varying from 140° to 220° C., the optimum temperature for recovery of vitamin A being about 180° C. Recently nearly pure vitamin A has been secured and it has been found that it distills at less than 100° C. under molecular distillation conditions. It is, therefore, seen that it is necessary according to known processes to use a temperature of about 80° C. above the boiling point of the vitamin to eliminate it from the distillate.

If a material having a boiling point in the neighborhood of that of the desired distillate is added to the mixture to be distilled, it is found that a considerably lower temperature can be used for optimum results. Thus, on vacuum distilling animal and vegetable oils to concentrate fat soluble and other vitamins contained therein, the addition of a quantity of other material having approximately the same boiling point under vacuum conditions as the desired vitamin, makes it possible to readily distill the vitamin, using a much lower temperature than previously possible.

The use of such lower temperatures is a very desirable feature where heat sensitive and easily decomposable materials are to be recovered. Furthermore, many of the desired distillates are solid or so viscous as to collect in the still and are difficult to remove. The addition of a liquid material having the proper boiling point will prevent such clogging and make continuous operation possible. Thus, the addition of fatty acids boiling in the neighborhood of sterols being distilled from an oil prevent the solid or viscous distillate from clogging the apparatus with resultant delay for cleaning.

The materials to be added may be selected from widely different types of compounds or mixtures thereof. Any material may be used as long as it has a boiling point in the neighborhood of the distillate desired, under molecular distillation conditions and has no adverse effect on the material undergoing treatment. Thus, fatty acids, esters, mineral oil fractions, terpenes, essential oils and the like have been found to give useful results. Of course, a compound which is subject to material decomposition should not be selected. Aliphatic phthalates, benzyl phthalate, beta phenyl ethyl phthalate, diglycerol tetrapropionate boil below vitamin A and are useful agents to employ in its recovery. In order to aid in a clearer understanding and description of the invention, the above-described materials are hereinafter referred to as entraining agents, although the expression is not to be taken as an explanation of the theory of the invention, or as a limitation to agents having only that function.

Many of the entraining agents selected are so expensive that they cannot be used without careful recovery. The distillates containing the entraining agent and the vitamin or other material distilled may be run through a separate still where the vitamin or other desired material may be separated. The entraining agent will remain as the still residue, if it had a higher boiling point than the desired purified material, or will be in the distillate, if it has a lower boiling point. In this way the agent can be recovered practically quantitatively. The agents may still contain small amounts of the desired purified material, but as they are used repeatedly, being added again and again to the fresh material initially treated, this does not represent a loss. Obviously other methods of separation known in the art, such as freezing, crystallization, solvent extraction or purely chemical means may be employed instead of distillation for separating the entraining agent.

As previously indicated, the entraining agent may have a boiling point the same as, above or below that of the substance to be removed. Preferably an agent having a boiling point below that of the desired substance is used, since the lower boiling entraining agent generally gives better results at lower temperatures.

As pointed out above, the invention is applicable to any process of vacuum distillation in which a difficultly volatile organic material is separated as the distillate. Thus, vitamins A, D and/or E may be separated by distillation from vegetable and animal oils containing them, such as cod, halibut, etc., liver oils, menhaden, salmon, dogfish, swordfish, corn wheat germ oils and the like. Hormones of various types may be recovered from oily concentrates by the present invention, as may also sterols and high boiling hydrocarbons from mixtures containing them.

The distillation may be carried out in the manner described in my U. S. Patents Nos. 1,925,559 and 1,942,858. Such molecular distillation processes are generally carried out at less than .1 mm. and at temperatures of between 70° and 250° C. preferably between 90 and 200° C. A characteristic of this type of distillation is that the vapors are condensed upon a surface located at a distance of less than about the mean free path of the molecules of residual gas. Pressures of above .1 mm. may be used and it has been found that volatile materials in fish oils may be distilled at pressures as high at 1 mm. Since a more economical removal of non-volatile constituents takes place at pressures below .01 mm. I prefer to operate at these lower pressures. However, as the entraining agents used enable a rapid recovery of the desired materials, it is not necessary in many cases to operate under molecular distillation conditions and pressures higher than those normally used in such processes may be employed.

I will now describe my invention by way of example as applied to a fish oil containing vitamins A and D.

I have found in my researches that, although pure vitamin A is an alcohol, the vitamin A occurring in fish oils and highly prized for its medicinal value is a mixture of esters with only a small proportion of the free alcohol. The alcohol boils at about 95° and the esters at 160° to 190° under a molecular vacuum. The vitamin D from these oils boils at around 140°. When, however, it is desired to drive the vitamins off from the parent oil, it is found that temperatures of 160° and higher are required for the D and 180° to 215° for the A. This is partly because the vitamins are present in such minute quantities and partly because there are only relatively small amounts of fatty glycerides in the oil of boiling points similar to the vitamins. The oil of commerce is rich in the long chain fatty glycerides, and comparatively rich in free fatty acids, but the fatty glycerides with 8 to 14 carbon atoms in the side chain are conspicuous by their absence. I therefore add, for instance, to the incoming oil four parts of glyceryl tri-pelargonate and I then find that distillation of a fraction rich in A and D occurs at a temperature of 160° C. The quantity of the fraction is about 5%.

I may add the tri-pelargonin for another reason. My researches have shown that the distillation characteristics of vitamin D and cholesterol are very similar. The vitamin D when ordinarily eliminated has so small a bulk that it takes a long time to drain from the condensing surface and often suffers decomposition on the way. With oils rich in cholesterol, the vitamin is held on the condensing surface in a mass of crystals. In melting these down, the vitamin D is volatilized and partly destroyed. It will be appreciated that when pelargonin or its equivalent is added, the bulk of the condensate is increased, the crystallization of the cholesterol is prevented, or minimized, and the vitamins are swept rapidly from the still.

It is not known how the agents used effect the results described. It may be that they form azeotropic mixtures with the desired material to be concentrated, or that they act to blow the material out in a manner similar to steam distillation. However, it is not intended that the invention be limited to any theory as to how the entraining agents effect the results of the herein described invention.

In the claims, where the entraining liquid is defined as having a boiling point at or in the neighborhood of that of the desired distillate or fraction, it is to be understood that the boiling points will be determined under approximately the same vacuum as that employed in carrying out the vacuum distillation. Also, since materials do not always boil under high vacuum conditions, it is to be understood that the term "boiling point" designates the analogous point of maximum rate of distillation when the vacuum is so high that distillation takes place by evaporation instead of by actual boiling.

The herein described invention constitutes a simple, economical and highly effective solution of the problem of removal by vacuum distillation of difficultly volatile organic compounds and particularly of heat sensitive difficultly volatile compounds from mixtures containing them. An outstanding advantage of my process is the more rapid distillation at lower temperatures than could heretofore be used and the possibility of distilling solids without clogging of the apparatus.

I claim:

1. The process which comprises adding to a fish oil containing fat soluble vitamins to be distilled, a liquid substance having a boiling point near that of the vitamin fraction and subjecting the mixture to molecular distillation.

2. The process of distillation which comprises adding to cod liver oil, a liquid substance having a boiling point near that of the vitamin fraction to be distilled and subjecting the mixture to molecular distillation.

3. The process of vacuum distillation which comprises adding to an oil containing fat soluble vitamins, a liquid compound having a boiling point near that of the desired vitamin fraction under the vacuum distillation conditions and subjecting the mixture to distillation at a temperature between 70 and 250° C. and a pressure of less than .1 mm. and condensing the vapor at a distance from the evaporative surface of less than the mean free path of the molecules of residual gas.

4. The process of vacuum distillation which comprises adding to a fish oil containing fat soluble vitamins, a liquid substance having a boiling point near that of the desired vitamin fractions and subjecting the mixture to distillation at a temperature between 70 and 250° C. and a pressure of less than .1 mm. and condensing the vapors at a distance from the evaporative surface of less than the mean free path of the molecules of the residual gas.

5. The process of distillation which comprises adding to cod liver oil a liquid substance having a boiling point near that of the desired vitamin fractions and subjecting the mixture to vacuum distillation at a temperature between 70 and 250° C. and a pressure of less than .1 mm. and condensing the vapors at a distance from the evaporative surface of less than the mean free path of the molecules of the residual gas.

6. The process which comprises adding tripelargonin to an oil containing fat soluble vitamins and subjecting the mixture to distillation at a temperature between 70 and 250° C. and a pressure of less than .1 mm. and condensing the vapors at a distance from the evaporative surface of less than the mean free path of the molecules of the residual gas.

7. The process which comprises adding to a vegetable or animal oil containing fat soluble vitamins a liquid having a vapor pressure in the neighborhood of that of a vitamin contained in the oil, subjecting the mixture to high vacuum distillation and separating a distillate containing the added substance and a vitamin.

8. The process which comprises adding to a vegetable or animal oil containing fat soluble vitamins at least one liquid substance which distills in maximum amounts under molecular distillation conditions at a temperature in the neighborhood of that at which a vitamin in the oil exhibits a maximum distillation rate and subjecting the mixture to molecular distillation.

9. The process which comprises adding to a vegetable or animal oil containing fat soluble vitamins, at least one liquid which distills in maximum amounts at a temperature in the neighborhood of that at which a vitamin in the oil exhibits a maximum distillation rate, subjecting the mixture to distillation at a temperature between about 70° and 250° C., at a pressure of less than about .01 mm. and condensing a distillate, containing the added liquid and a vitamin, at a distance from the evaporating surface of less than about the mean free path of the molecules of residual gas.

10. The process of separating substances of the class consisting of hormones, sterols and vitamin D from oils containing them, which comprises adding to the oil a liquid substance having a boiling point near that of the hormone, sterol, or vitamin D, subjecting this mixture to distillation under a high vacuum, and separating a distillate containing the added liquid substance and the hormone, sterol or vitamin D.

KENNETH C. D. HICKMAN.